(12) United States Patent
Chen et al.

(10) Patent No.: US 9,154,260 B2
(45) Date of Patent: Oct. 6, 2015

(54) METHOD AND APPARATUS FOR RELIABLE TRANSMISSION OF CONTROL INFORMATION IN A WIRELESS COMMUNICATION NETWORK

(75) Inventors: Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 779 days.

(21) Appl. No.: 13/071,400

(22) Filed: Mar. 24, 2011

(65) Prior Publication Data

US 2011/0235584 A1    Sep. 29, 2011

Related U.S. Application Data

(60) Provisional application No. 61/318,168, filed on Mar. 26, 2010.

(51) Int. Cl.
*H04L 1/00* (2006.01)

(52) U.S. Cl.
CPC ............... *H04L 1/004* (2013.01); *H04L 1/008* (2013.01)

(58) Field of Classification Search
None
See application file for complete search history.

(56) References Cited

U.S. PATENT DOCUMENTS

| | | | |
|---|---|---|---|
| 2008/0273610 A1 | 11/2008 | Malladi et al. | |
| 2010/0034161 A1* | 2/2010 | Luo et al. | 370/329 |
| 2010/0195640 A1 | 8/2010 | Park et al. | |
| 2010/0227569 A1* | 9/2010 | Bala et al. | 455/73 |
| 2010/0232373 A1* | 9/2010 | Nory et al. | 370/329 |
| 2010/0254268 A1 | 10/2010 | Kim et al. | |
| 2010/0254329 A1* | 10/2010 | Pan et al. | 370/329 |
| 2010/0297991 A1* | 11/2010 | Dahlman et al. | 455/422.1 |
| 2010/0309867 A1 | 12/2010 | Palanki et al. | |
| 2011/0122825 A1* | 5/2011 | Lee et al. | 370/328 |
| 2014/0169304 A1* | 6/2014 | DiGirolamo et al. | 370/329 |

FOREIGN PATENT DOCUMENTS

| | | |
|---|---|---|
| CN | 101529961 A | 9/2009 |
| EP | 1337075 A2 | 8/2003 |

(Continued)

OTHER PUBLICATIONS

International Search Report and Written Opinion—PCT/US2011/030079, ISA/EPO—Jul. 6, 2011.

(Continued)

*Primary Examiner* — Chirag Shah
*Assistant Examiner* — Srinivasa Reddivalam
(74) *Attorney, Agent, or Firm* — Anthony R. Morris

(57) ABSTRACT

Techniques for reliably transmitting and receiving control information in a wireless network are described. A cell may typically send control information on a control channel and associated data (e.g., system information) on a data channel in the same subframe. This subframe may have strong interference from other cells. For cross-subframe signaling, the cell may transmit the control information in a first subframe and the associated data in a second subframe. The first subframe may be a usable subframe for the cell and may have less interference from other cells. A UE may not know the location of the first subframe and may perform window-based decoding. The UE may decode the control channel in at least one subframe within a decoding window covering the first subframe to obtain the control information. The UE may then decode the data channel in the second subframe based on the control information to obtain the data.

36 Claims, 9 Drawing Sheets

(56) References Cited

FOREIGN PATENT DOCUMENTS

| | | |
|---|---|---|
| EP | 1414178 A1 | 4/2004 |
| EP | 1605600 A1 | 12/2005 |
| EP | 1953977 A1 | 8/2008 |
| JP | 2009513058 A | 3/2009 |
| JP | 2010530708 A | 9/2010 |
| WO | 2007052921 A1 | 5/2007 |
| WO | 2008117965 A2 | 10/2008 |
| WO | 2008156412 A2 | 12/2008 |
| WO | WO2010011104 | 1/2010 |

OTHER PUBLICATIONS

Hosein, P., Resource Allocation for the LTE Physical Downlink Control Channel, 2009 IEEE GLOBECOM Workshops, 2009, pp. 1-5.

* cited by examiner

METHOD AND APPARATUS FOR RELIABLE TRANSMISSION OF CONTROL INFORMATION IN A WIRELESS COMMUNICATION NETWORK

The present application claims priority to provisional U.S. Application Ser. No. 61/318,168, entitled METHODS FOR RELIABLE CONTROL INFORMATION TRANSMISSION FOR LTE-A, filed Mar. 26, 2010, assigned to the assignee hereof and incorporated herein by reference in its entirety.

BACKGROUND

I. Field

The present disclosure relates generally to communication, and more specifically to techniques for transmitting and receiving control information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). Each base station may provide communication coverage for one or more cells, where the term "cell" can refer to a coverage area of a base station and/or a base station subsystem serving the coverage area. A UE may communicate with a cell via the downlink and uplink. The downlink (or forward link) refers to the communication link from the cell to the UE, and the uplink (or reverse link) refers to the communication link from the UE to the cell.

A cell may transmit control information and data to one or more UEs on the downlink. A downlink transmission from the cell may observe interference due to downlink transmissions from other cells. The interference may adversely impact the reliability of the downlink transmission from the cell.

SUMMARY

Techniques for reliably transmitting and receiving control information in a wireless communication network are described herein. A cell may typically transmit control information on a control channel and associated data on a data channel in the same subframe. The control channel may be a Physical Downlink Control Channel (PDCCH) or some other control channel, and the data channel may be a Physical Downlink Shared Channel (PDSCH) or some other data channel. The control information may include various parameters needed to decode the data channel. The data may include system information needed by UEs to operate in the wireless network.

The cell may observe strong interference from neighbor cells in a subframe in which data is sent. In one design, cross-subframe signaling may be employed, and the cell may transmit control information in a first subframe and associated data in a second subframe. The first subframe may be a usable subframe for the cell and may have less interference from the neighbor cells than the second subframe.

In an aspect, a UE may not know the location of the first subframe in which the control channel is transmitted by the cell and may perform window-based decoding. In one design, the UE may decode the control channel in at least one subframe within a decoding window covering a plurality of subframes including the first subframe to obtain the control information sent on the control channel. The UE may then decode the data channel in the second subframe at or after the end of the decoding window, based on the control information, to obtain the data (e.g., system information) sent on the data channel. In one design, the decoding window may cover at least one usable subframe for the cell, and the control information may be transmitted in a usable subframe within the decoding window.

In another aspect, the cell may transmit the control information in a designated subframe for the cell. Different cells may be assigned different designated subframes having less interference from other cells. In one design, the UE may determine the designated subframe for the cell based on first information available to the UE for the cell. The first information may comprise a cell identity (ID) of the cell, which may be obtained by the UE based on at least one synchronization signal from the cell. The UE may decode the control channel in the designated subframe to obtain control information sent on the control channel by the cell. The UE may then decode the data channel in the second subframe based on the control information to obtain the data (e.g., system information) sent on the data channel by the cell.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc.

UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
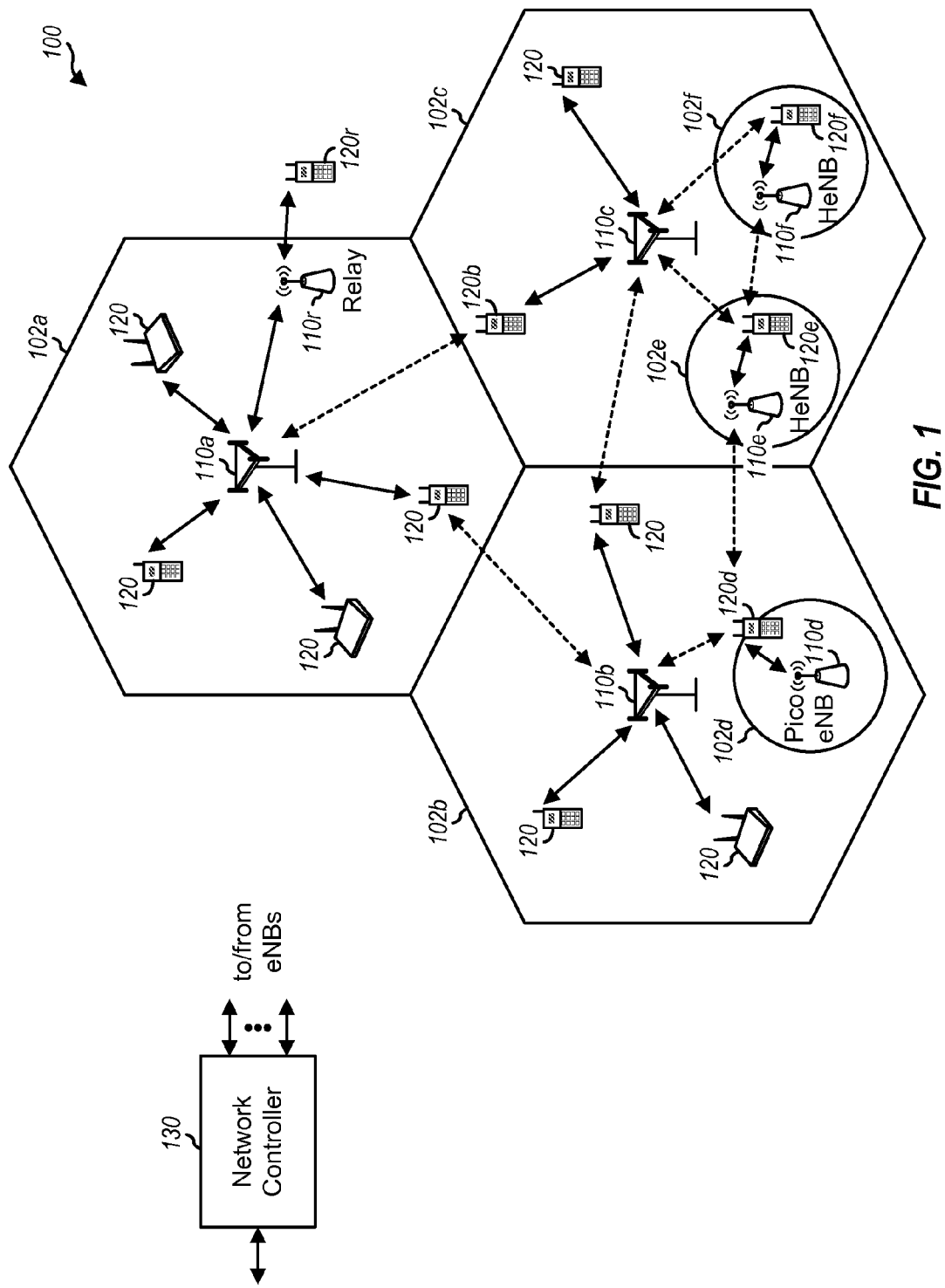
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, a node, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. The terms "eNB", "base station", and "cell" may be used interchangeably herein.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. An eNB 110d may be a pico eNB for a pico cell 102d. eNBs 110e and 110f may be home eNBs (HeNBs) for femto cells 102e and 102f, respectively.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110r may communicate with macro eNB 110a via a backhaul link and with a UE 120r via an access link in order to facilitate communication between eNB 110a and UE 120r.

Wireless network 100 may be a heterogeneous network (HetNet) that includes eNBs of different types, e.g., macro eNBs, pico eNBs, femto eNBs, relays, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 (e.g., 120b, 120d) may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc. A UE may be able to communicate with macro eNBs, pico eNBs, femto eNBs, relays, etc. A UE may also be able to communicate peer-to-peer (P2P) with another UE. In FIG. 1, a solid line with double arrows indicates communication between a UE and an eNB. A dashed line with double arrows indicates interfering transmissions between a UE and an eNB.

Figure 2:
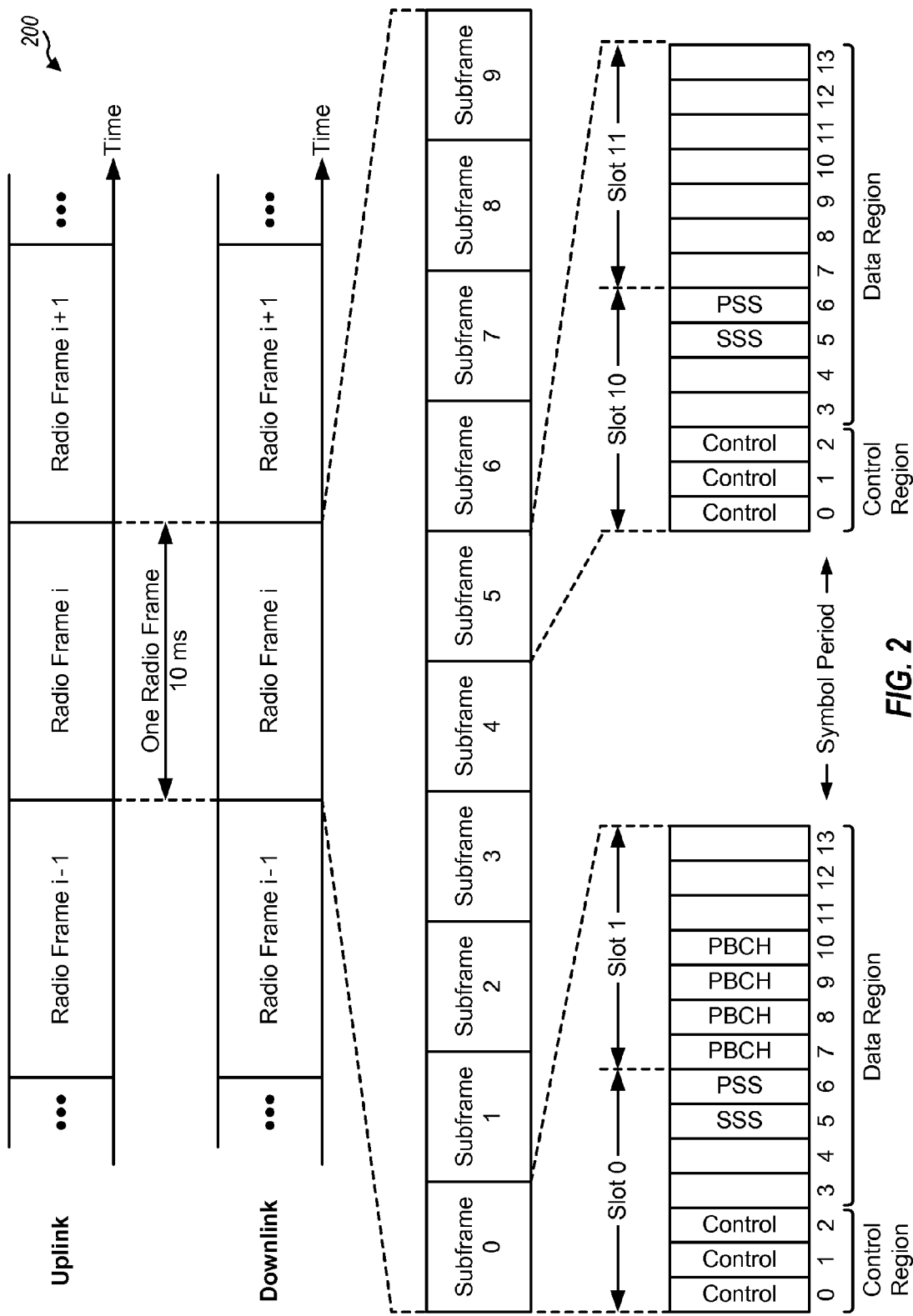
FIG. 2 shows an exemplary frame structure.

FIG. 2 shows a frame structure 200 for frequency division duplexing (FDD) in LTE. For FDD, the downlink and uplink may be allocated separate frequency channels. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

Each subframe for the downlink may include a control region and a data region, which may be time division multiplexed (TDM) as shown in FIG. 2. The control region may include the first K symbol periods of the subframe, where K may be equal to 1, 2, 3 or 4 and may change from subframe to subframe. The control region may carry control information for UEs. The data region may include the remaining symbol periods of the subframe and may carry data and/or other information for UEs.

In LTE, a cell may transmit a Physical Control Format Indicator Channel (PCFICH), a Physical HARQ Indicator Channel (PHICH), and a Physical Downlink Control Channel (PDCCH) in the control region of a subframe. The PCFICH may be transmitted in the first symbol period of the subframe and may convey the size of the control region (i.e., the value of K). The PHICH may carry acknowledgement (ACK) information on the downlink for data transmission sent on the uplink with hybrid automatic retransmission (HARQ) by UEs. The PDCCH may carry control information for UEs. The control information may comprise downlink grants, uplink grants, power control information, etc. The cell may transmit a Physical Downlink Shared Channel (PDSCH) in the data region of a subframe. The PDSCH may carry traffic data for UEs scheduled for data transmission on the downlink. The PDSCH may also carry system information and/or other information.

A cell may transmit a primary synchronization signal (PSS) and a secondary synchronization signal (SSS) in symbol periods 6 and 5, respectively, in subframes 0 and 5 of each radio frame with the normal cyclic prefix, as shown in FIG. 2. The cell may generate the PSS and SSS based on a cell ID. The PSS and SSS may be used by the UEs for cell search and acquisition.

A cell may transmit a Physical Broadcast Channel (PBCH) in symbol periods 0 to 3 in slot 1 of each radio frame, as shown in FIG. 2. The PBCH may carry some system information such as a master information block (MIB). The cell may transmit other system information such as system information blocks (SIBs) on the PDSCH in certain subframes. The MIB may carry a small amount of the most important system information, e.g., a limited number of essential parameters used to acquire other information from the cell. The SIBs may carry the remaining system information. The MIB and SIBs may allow the UEs to receive transmissions on the downlink and/or send transmissions on the uplink.

Figure 3:
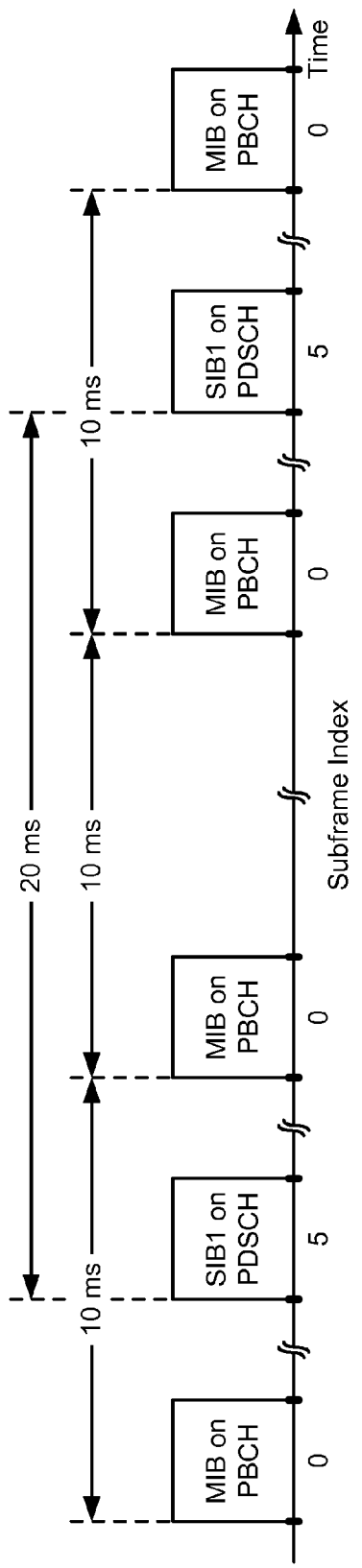
FIG. 3 shows an exemplary transmission of system information by a cell.

FIG. 3 shows an exemplary transmission of system information by a cell. The cell may periodically transmit the MIB on the PBCH with a fixed schedule of 40 ms. The MIB may be sent in four transmissions in subframe 0 of four consecutive radio frames. The cell may also periodically transmit SIB type 1 (SIB1) on the PDSCH with a periodicity of 80 ms. SIB1 may be sent in four transmissions in subframe 5 of four even-numbered radio frames. SIB1 may carry scheduling information for system information (SI) messages as well as a mapping of SIBs of other types to the SI messages. The cell may also transmit each remaining SIB with a periodicity indicated by the scheduling information in SIB1. Each SIB may carry a set of parameters to support operation by UEs.

Wireless network 100 may be a heterogeneous network, as described above. The interference characteristics in a heterogeneous network with cells of different types may be significantly different than the interference characteristics in a homogenous network with cells of only one type (e.g., only macro cells). Cells of different types may operate on the same frequency channel in a co-channel deployment and may cause strong interference to one another, which may result in service outage. For example, femto cells may cause excessive interference to macro cells (or vice versa) and possibly to other femto cells. Different maximum transmit power levels for different types of cells may also create downlink/uplink imbalance. For example, a UE may be located closer to a femto cell than a macro cell but may have (i) a better downlink for the macro cell than the femto cell due to the higher transmit power level of the macro cell but (ii) a better uplink for the femto cell than the macro cell due to the lower pathloss to the femto cell. The UE may communicate with the femto cell and may then observe strong interference from the macro cell on the downlink.

Interference management may be performed to protect downlink and/or uplink transmissions from excessive interference. In one design of interference management, resource partitioning may be performed to allocate different resources to cells of different types (or different power classes). Cells of each type may then use their allocated resources with little or no interference from cells of other types. In general, resource partitioning may be performed in the time domain and/or frequency domain.

In one design, resource partitioning may be performed in the time domain, and cells of each type may be allocated some subframes having little or no interference from cells of other types. In one design, three types of subframes may be defined as follows:

"U" subframe—a subframe that is usable for a given cell and typically has little or no interference from cells of other types, "N" subframe—a subframe that is typically not usable by a given cell in order to avoid causing excessive interference to cells of other types, and "X" subframe—a subframe that may be flexibly used by a given cell depending on various factors.

In general, subframes may be allocated to cells of different types in various manners. In one design, Q interlaces with indices of 0 through Q−1 may be defined, where Q may be equal to 4, 6, 8, 10, or some other value. Each interlace may include subframes that are spaced apart by Q frames. Hence, interlace q may include subframes q, q+Q, q+2Q, etc., where $q \in \{0, \ldots, Q-1\}$. Each interlace may be allocated to cells of a particular type.

Figure 4:
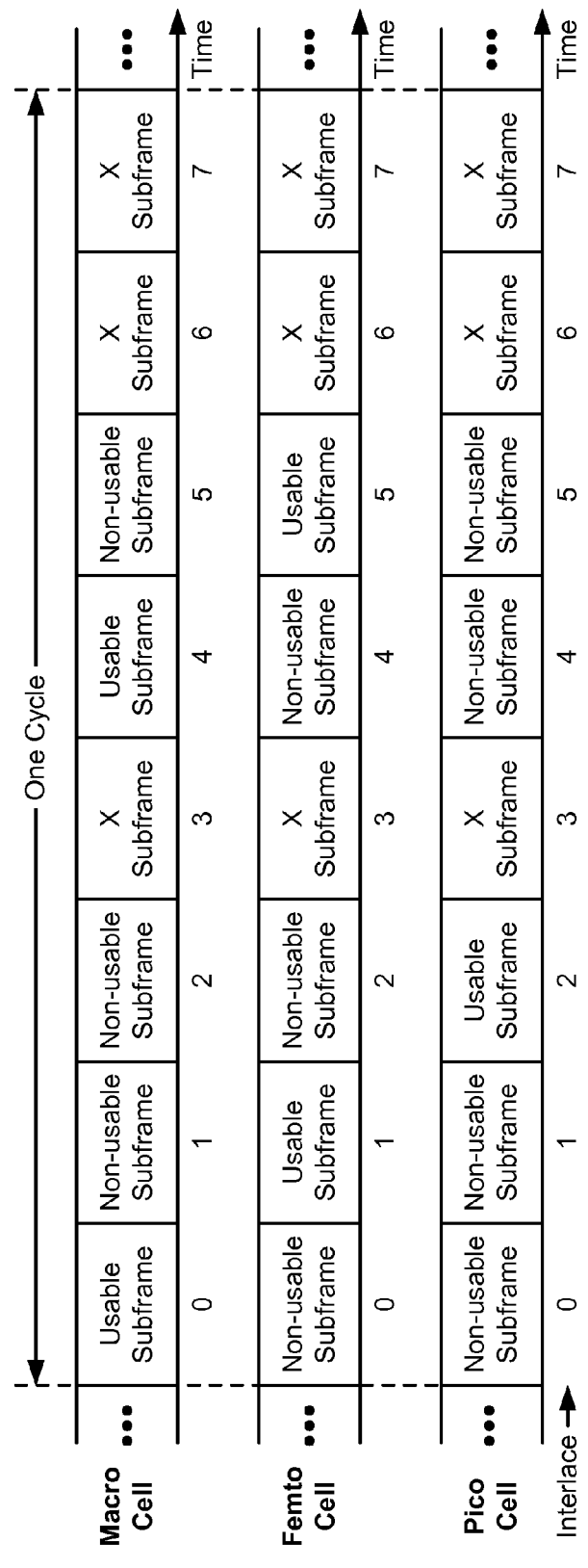
FIG. 4 shows a design of time-domain resource partitioning for different cells.

FIG. 4 shows an example of time-domain resource partitioning for a case in which Q=8 and eight interlaces 0 through 7 are available. In the example shown in FIG. 4, interlaces 0 and 4 are allocated to macro cells, interlace 1 and 5 are allocated to femto cells, interlace 2 is allocated to pico cells, and interlaces 3, 6 and 7 are flexible subframes.

The U subframes of each cell may correspond to the subframes in the interlace(s) allocated to that cell. The U subframes and N subframes of cells of different types may be configured in a complementary manner, so that a U subframe of a cell of a particular type corresponds to N subframes of cells of other types. This complementary definition of subframes may enable reliable transmission of data and control information, especially when cells of different types are neighbors and interfere with each other.

Resource partitioning may be performed in a semi-static or static manner, e.g., via negotiation between cells through the backhaul. Each cell may know the results of the resource partitioning and may be aware of the different types of subframes applicable to that cell. Each cell may use its U subframes, which may correspond to subframes in its allocated interlace(s). Each cell may avoid causing excessive interference in its N subframes, which may correspond to subframes in interlaces allocated to cells of other types. For example, a cell may transmit at a low power level to UEs located close to the cell in its U subframes and may then avoid causing strong interference to UEs in neighbor cells. A cell may also avoid transmitting in its U subframes to avoid causing any interference to the UEs in the neighbor cells. A cell may or may not use its X subframes depending on a decision made by/for the cell based on various factors such as load information of involved cells, UE channel information, traffic information, availability of information among different cells, etc. A cell may choose to allocate such X subframes to leave itself some freedom in scheduling as well. A cell may use its U subframes the most, its X subframes as necessary, and its N subframes the least.

In general, resource partitioning may be performed for only the downlink, or only the uplink, or both the downlink and uplink. Resource partitioning for the downlink may or may not match resource partitioning for the uplink. For example, a cell may have a first set of U, N and X subframes for the downlink and a second set of U, N and X subframes for the uplink. For clarity, much of the description below relates to resource partitioning for the downlink.

In LTE, a cell may transmit data on the PDSCH in a portion of the system bandwidth. Hence, neighboring cells may perform interference coordination in the frequency domain for the data region and may transmit data on the PDSCH in different portions of the system bandwidth. As a result, data may be reliably sent on the PDSCH in subframes of all types, including N subframes, via careful scheduling.

In LTE, a cell may transmit control information on the PDCCH across the system bandwidth. Hence, it may be more difficult for neighboring cells to perform interference coordination in the frequency domain for the control region. As a result, control information should be sent in subframes having little or no interference, such as U subframes or possibly X subframes.

Figure 5:
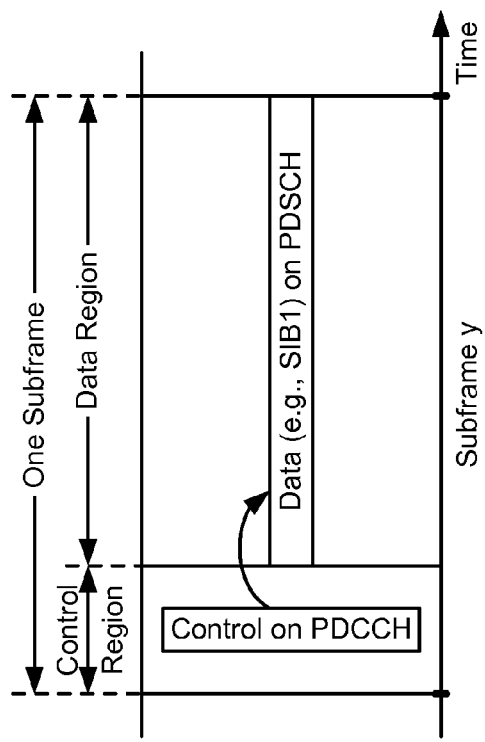
FIG. 5 shows exemplary transmissions of control information and data.

FIG. 5 shows exemplary transmissions of the PDCCH and PDSCH in LTE Release 8 (Rel-8). A cell may transmit control information on the PDCCH in the control region of a given subframe y and may also transmit data (e.g., SIB1) associated with the control information on the PDSCH in the data region of the same subframe y. The control information may include a downlink grant comprising various parameters for an associated transmission of data on the PDSCH. A UE may decode the PDCCH in the control region of the subframe and may obtain the downlink grant from the control information sent on the PDCCH. The UE may then decode the PDSCH in the data region based on the downlink grant and obtain the data (e.g., SIB1) sent on the PDSCH.

In LTE Release 8, a cell may transmit control information on the PDCCH and an associated transmission of data (e.g., SIB1) on the PDSCH in the same subframe. To achieve good reliability, the data should be transmitted on the PDSCH in subframes with sufficiently low interference, such as U subframes or possibly X subframes.

A cell may be required to transmit SIB1 on the PDSCH in subframe 5 of even-numbered radio frames, e.g., subframes 5, 25, 45, etc. For FDD, the cell may also be required to transmit paging messages on the PDSCH in subframes 0, 4, 5 and/or 9 of a radio frame, depending on higher layer configuration. Hence, the cell may be required to transmit SIB1 and paging messages on the PDSCH in specified subframes.

A cell should transmit SIB1 and paging messages such that they can be reliably receive by all UEs within the coverage of the cell. The cell may be able to reliably transmit SIB1 and paging messages on the PDSCH in the data region of the specified subframes, regardless of whether these subframes are U, X or N subframes. However, the cell may not be able to reliably transmit the associated control information on the PDCCH in the control region of the specified subframes, e.g., if the specified subframes happen to be N subframes. For example, subframe y in FIG. 5 may be an N subframe having strong interference from neighbor cells. The cell may still be able to reliably transmit SIB1 and/or paging messages on the PDSCH in subframe y but may be unable to reliably transmit the associated control information on the PDCCH in subframe y.

In an aspect, cross-subframe signaling may be used to reliably transmit control information. A cell may be required to transmit data (e.g., SIB1) in a specified subframe but may be unable to reliably transmit the associated control information in this subframe. For example, the specified subframe may be an N subframe having strong interference from neighbor cells in the control region of the subframe. The cell may then transmit the control information in another subframe (e.g., a U subframe) having sufficiently low interference from the neighbor cells. This may then allow the UEs to reliably receive the control information.

Figure 6:
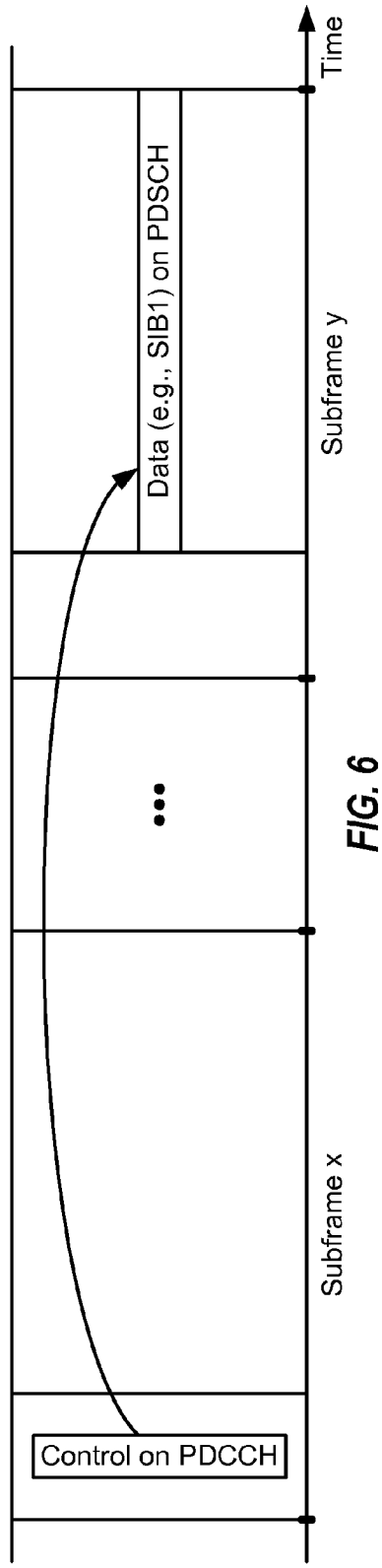
FIG. 6 shows exemplary transmissions of control information and data with cross-subframe signaling.

FIG. 6 shows exemplary transmissions of the PDCCH and PDSCH with cross-subframe signaling. A cell may transmit control information on the PDCCH in the control region of a given subframe x, which may be a U subframe or possibly an X subframe of the cell. The cell may transmit data (e.g., SIB1) associated with the control information on the PDSCH in the data region of a specified subframe y, which may be an N subframe of the cell. Subframe x may be the closest U subframe of the cell that precedes subframe y. A UE may decode the PDCCH in the control region of subframe x and may obtain the control information sent on the PDCCH. The UE may then decode the PDSCH in the data region of subframe y based on the control information received in subframe x and may obtain the data (e.g., SIB1) sent on the PDSCH.

Cross-subframe signaling may be required for only a fraction of the UEs in a given cell. Other UEs in the cell (e.g., UEs close to the cell) may not observe strong interference from neighbor cells and may be able to reliably receive control information in the specified subframe. The cell may thus transmit control information also in the specified subframe for these UEs as well as for UEs that expect control information to be sent in the same subframe as the associated data.

To support cross-subframe signaling, the affected UEs should know the subframe in which the PDCCH carrying control information for the PDSCH carrying data of interest (e.g., SIB1) is sent. A cell may transmit the data of interest on the PDSCH in subframe y and may transmit the associated control information on the PDCCH in the closest U subframe preceding subframe y. The cell may also broadcast subframe type information indicative of the type of each subframe of the cell (or indicative of the U subframes of the cell) in the MIB. The affected UEs may then be able to determine the closest U subframe preceding subframe y based on the subframe type information received from the cell and may be able to decode the PDCCH in this U subframe. However, if the cell broadcasts the subframe type information in SIB1 (or some other SIB), then the affected UEs (i) would need this information in order to determine the U subframe and decode the PDCCH for the PDSCH transmission carrying SIB1 but (ii) would not have this information until the PDCCH and the associated PDSCH transmission for SIB1 are decoded. This problem may be addressed in several manners, as described below.

In a first design of supporting cross-subframe signaling, a UE may perform window-based decoding for the PDCCH when the UE does not know the subframe in which the PDCCH carrying control information for the PDSCH carrying data of interest is transmitted. This may be the case, for example, when the UE has no knowledge of the U subframes of a cell. For window-based decoding, the UE may decode the PDCCH in each subframe within a PDCCH decoding window. The window size may be selected such that the decoding window covers the subframe in which the PDCCH is sent.

Figure 7:
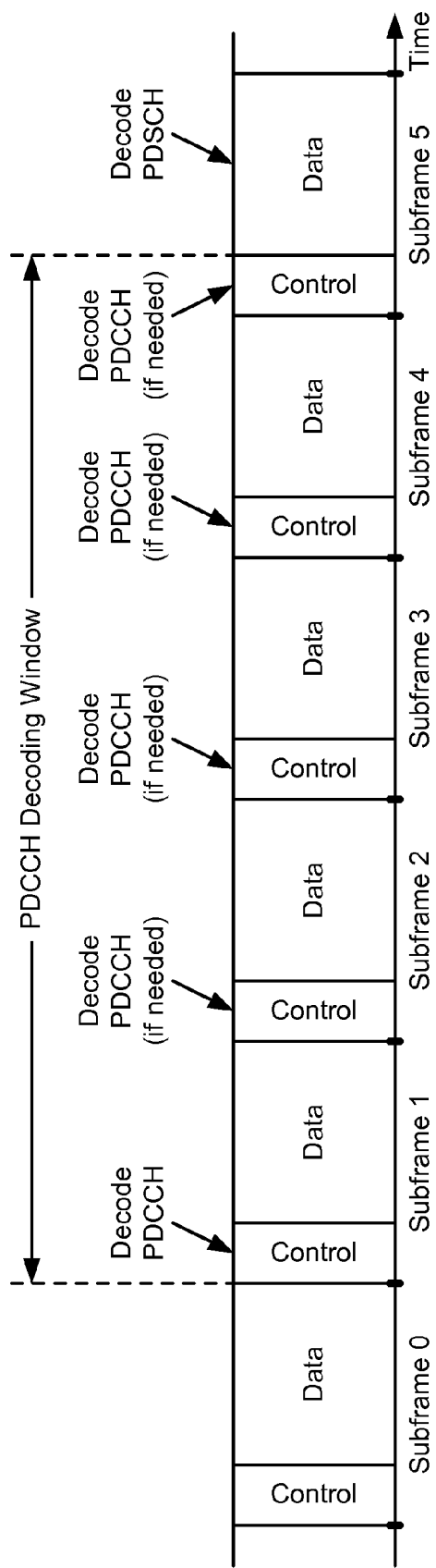
FIG. 7 shows an example of window-based decoding.

FIG. 7 shows an example of window-based decoding of the PDCCH for reception of SIB1 sent on the PDSCH in specified subframe 5. A UE may detect the PSS and SSS of a cell and may be able to determine the frame timing of the cell. The UE may be able to ascertain specified subframe 5 in which SIB1 is transmitted by the cell based on the UE's knowledge of the frame timing of the cell. The UE may perform window-based decoding for the cell if reliable decoding of the PDCCH in subframe 5 is not possible and if the UE has no explicit information on the U subframes of the cell or where the PDCCH for SIB1 can be reliably transmitted by the cell. The UE may implicitly or explicitly know that it cannot reliably receive the PDCCH in subframe 5. For example, the UE may implicitly know based on handover bias values among involved cells, whether or not the UE has capability for interference cancellation, the first step of decoding the PSS and SSS and whether the cell in question is subject to strong interference or not, etc. The UE may explicitly know based on signaling, e.g., in the MIB.

In the example shown in FIG. 7, the decoding window has a size of four subframes and covers preceding subframes 1 through 4 as well as the control region of specified subframe 5. The UE may decode the PDCCH starting with the first subframe within the decoding window, which is subframe 1 for the example shown in FIG. 7. If the PDCCH is decoded correctly, then the UE may skip decoding the PDCCH in the remaining subframes within the decoding window and may decode the PDSCH in specified subframe 5 based on the control information obtained from the PDCCH in subframe 1. If the PDCCH is decoded in error in the first subframe, then the UE may decode the PDCCH in the next subframe within the decoding window, which is subframe 2 for the example shown in FIG. 7. The UE may repeat the decoding of the PDCCH until it is decoded correctly or all subframes within the decoding window have been considered. The UE may decode the PDSCH in specified subframe 5 if the associated PDCCH can be correctly decoded in any subframe within the decoding window.

The window size may be selected based on a tradeoff between UE complexity and subframe allocation flexibility. A larger window size may require the UEs to perform more decoding attempts for the PDCCH (thereby increasing UE complexity) but may allow for more flexibility to allocate subframes to cells of different types. For example, eight interlaces may be defined as shown in FIG. 4, each interlace may be allocated to a particular type of cell, and the periodicity of subframe type configuration may be 8. If the window size is 7, then there may be no restriction on the subframe type configuration for a given cell, which may be allocated any one of the eight interlaces. However, if the window size is 3, then a cell should be allocated interlaces such that there is at least one U subframe for the cell in every four consecutive subframes.

A window size of 0 may imply that window-based decoding is disabled and that the decoding window covers only the control region of the subframe in which the PDSCH carrying data of interest is sent. A window size of 0 may be used when the control information on the PDCCH and the associated data on the PDSCH are always sent in the same subframe.

In a second design of supporting cross-subframe signaling, PDCCH transmissions for PDSCH transmissions of interest may be sent in predetermined locations. For example, each cell may transmit the PDCCH carrying control information for the PDSCH carrying SIB1 (or some other information) in designated subframes for that cell. The designated subframes may be considered as predetermined U subframes.

In one design, the designated subframes for each cell may be linked to cell ID. In this design, the UEs may be able to ascertain the designated subframes of each cell based on the cell ID of that cell, which may be obtained from the PSS and SSS transmitted by the cell. Hence, no explicit signaling may be necessary to convey the PDCCH locations for the PDSCH transmissions of interest.

In one design, the designated subframes for each cell may be defined as follows:

$$n \in (10*\text{frame\_num} + \text{subframe\_num}) \bmod K1 = \text{cell ID} \bmod K2, \qquad \text{Eq (1)}$$

where
frame_num is an index of a radio frame and is within a range of 0 to 4095 in LTE,
subframe_num is an index of a subframe and is within a range of 0 to 9, K1 and K2 are predefined parameters,
n is an index of a designated subframe for a cell with the cell ID, and
"mod" denotes a modulo operation.

The designated subframes for a cell may be defined based on equation (1) as follows. The quantity within parentheses on the left hand side of the equality in equation (1) may be computed for each subframe in each radio frame. A first value may be obtained for each subframe of each radio frame by taking a modulo of this quantity with respect to K1. A second value may be obtained by taking a modulo of the cell ID of the cell with respect to K2. Each subframe in which the first value is equal to the second value may be defined as a designated subframe for the cell.

For example, the designated subframes for different cells for a case in which K1=8 and K2=3 may be defined as follows:
Cells with cell IDs 0, 3, 6, 9, . . . have designated subframes 0, 8, 16, 24, . . .
Cells with cell IDs 1, 4, 7, 10, . . . have designated subframes 1, 9, 17, 25, . . .
Cells with cell IDs 2, 5, 8, 11, . . . have designated subframes 2, 10, 18, 26, . . .

In the design shown in equation (1), K2 groups of cell IDs may be defined, and each group may include cell IDs that are spaced apart by K2. For example, when K2=3, three groups of cell IDs may be defined, the first group may include cell IDs 0, 3, 6, . . . , the second group may include cell IDs 1, 4, 7, . . . , and the third group may include cell IDs 2, 5, 8, . . . . Each group of cell IDs may be assigned a different set of designated subframes. For example, the first group of cell IDs may be assigned designated subframes 0, 8, 16, . . . , the second group of cell IDs may be assigned designated subframes 1, 9, 17, . . . , and the third group of cell IDs may be assigned designated subframes 2, 10, 18, . . . .

In the design shown in equation (1), K2 denotes the number of groups of cell IDs as well as the number of sets of designated subframes. K1 denotes the spacing between successive designated subframes in each set of designated subframes.

In another design, K2 groups of cell IDs may be defined such that each group includes contiguous cell IDs. For example, the first group may include cell IDs 0 through M1, the second group may include cell IDs M1+1 through M2, the third group may include cell IDs M2+1 through M3, etc. For example, if K2=3 and a total of 504 cell IDs are available, then the first group may include cell IDs 0 through 167, the second group may include cell IDs 168 through 335, and the third group may include cell IDs 336 through 503. Each group of cell IDs may be assigned a different set of designated subframes.

In general, the total available cell IDs may be partitioned into K2 groups of cell IDs in various manners. The K2 groups may include the same or different numbers of cell IDs. Each group may include contiguous or non-contiguous cell IDs. K2 sets of designated subframes may also be defined. The K2 sets may include the same or different numbers of designated subframes. The K2 sets may also include different non-overlapping designated subframes so that each subframe may be a designated subframe in at most one set. Each group of cell IDs may be assigned a different set of designated subframes.

In one design, cells of different types may be assigned different groups of cell IDs and hence different sets of designated subframes. For example, macro cells may be assigned the first group of cell IDs and the first set of designated subframes, femto cells may be assigned the second group of cell IDs and the second set of designated subframes, and pico cells may be assigned the third group of cell IDs and the third set of designated subframes. Each cell may transmit the PDCCH carrying control information for the PDSCH carrying SIB1 (or some other information) in the set of designated subframes assigned to that cell.

In LTE Release 8, a cell may transmit PDCCH for overhead in 4 or 8 control channel elements (CCEs) and may transmit PDCCH for traffic data in 1, 2, 4 or 8 CCEs. PDCCH for overhead refers to PDCCH carrying control information for PDSCH carrying system information (e.g., SIB1) or broadcast information (e.g., paging messages). PDCCH for traffic data refers to PDCCH carrying control information for PDSCH carrying traffic data. Each CCE includes nine resource elements, and each resource element covers one subcarrier in one symbol period. Transmission of the PDCCH in 1, 2, 4 or 8 CCEs corresponds to an aggregation level of 1, 2, 4 or 8, respectively. Different aggregation levels may be used for different levels of protection for control information sent on the PDCCH. A cell may transmit PDCCH for overhead in a common search space that is decoded by all UEs. A cell may transmit PDCCH for traffic data in either the common search space or a UE-specific search space that is applicable for a particular UE.

In one design, inter-cell coordination of PDCCH scheduling may be performed. In this design, neighboring cells may coordinate and schedule their PDCCH transmissions such that reliable PDCCH transmissions can be achieved for each cell. In this design, each cell may transmit the PDCCH and PDSCH for SIB1 in specified subframe 5 of even-numbered radio frames, as defined in LTE Release 8. However, cells of different types may transmit their PDCCHs on different sets of resource elements that overlap as little as possible in order to mitigate interference between the PDCCH transmissions from these cells. This may be achieved in various manners.

In one design, a cell may transmit the PDCCH for overhead in 1 or 2 CCEs in the common search space with aggregation level of 1 or 2, respectively. By adding aggregation levels 1 and 2 for the PDCCH for overhead (which are associated with fewer CCEs to transmit the PDCCH), it may be easier to schedule the PDCCH for overhead with fewer collisions among cells of different types.

In another design, the cell IDs may be assigned to cells such that the PCFICHs from different cells overlap as little as possible. In yet another design, the PCFICHs and PHICHs for different cells may be configured such that the PDCCHs for these cells overlap as little as possible. The PCFICH indicates the size of the control region and may be set to K to obtain a control region of K symbol periods, where K may be equal to 1, 2, 3 or 4. The PCFICH for some cells may be set to K=1 (for large bandwidths) or K=2 (for small bandwidths) in specified subframe 5 of even-numbered radio frames. The PCFICH for other cells may be set to K=3 (for large bandwidths) or K=4 (for small bandwidths) in subframe 5 of even-numbered radio frames (or to K=2 in some special subframes such as MBSFN subframes). The above configurations of the PCFICH may facilitate interference management as follow. Victim cells observing strong interference from other cells may have their PCFICHs set to K=3 (or 4), and the PDCCHs for these victim cells may be more likely located in the second and third symbol periods of the control region. The duration of the PHICHs for the victim cells may also be set (e.g., to Ng=2 in the MIB) such that the PHICHs can be sent in as much resources as possible. This setting of the PHICHs may result in the PDCCHs of the victim cells being more likely to be mapped to the second and third symbol periods of the control region. Interfering cells may have their PCFICHs set to K=1 (or 2), and the PDCCHs for these interfering cells may be located in only the first symbol period of the control region. The PDCCHs for the interfering cells and the PDCCHs for the victim cells may thus be time division multiplexed in the control region.

For clarity, the techniques for mitigating interference and improving reliability of control information have been described above for transmission of SIB1 on the downlink. The techniques may also be used to transmit control information associated with transmission of system information, paging information, broadcast information, and/or traffic data on the downlink.

The techniques may also be used to transmit downlink control information associated with uplink control information and/or traffic data on the uplink. For example, a cell may transmit control information comprising an uplink grant for a UE on the PDCCH in subframe m, and the uplink grant may be applicable for an uplink transmission on a Physical Uplink Shared Channel (PUSCH) in subframe n, where m and n may be separated by a fixed offset in LTE Release 8. However, subframe m may observe strong interference from neighbor cells. The cell may then transmit control information for the UE on the PDCCH in subframe k, which may be the closest U subframe of the cell prior to subframe m.

In general, reliable transmission of control information may be achieved by transmitting the control information on a different subframe, or a different carrier, or the data region instead of in the control region of a specified subframe on a specified carrier. In particular, the PDCCH carrying control information for an associated PDSCH or PUSCH transmission may be transmitted in a different subframe (e.g., a U subframe), on a different carrier, and/or in the data region (via interference coordination in the data region) having less interference instead of in a subframe observing strong interference (e.g., an N subframe).

Figures 8, 9:
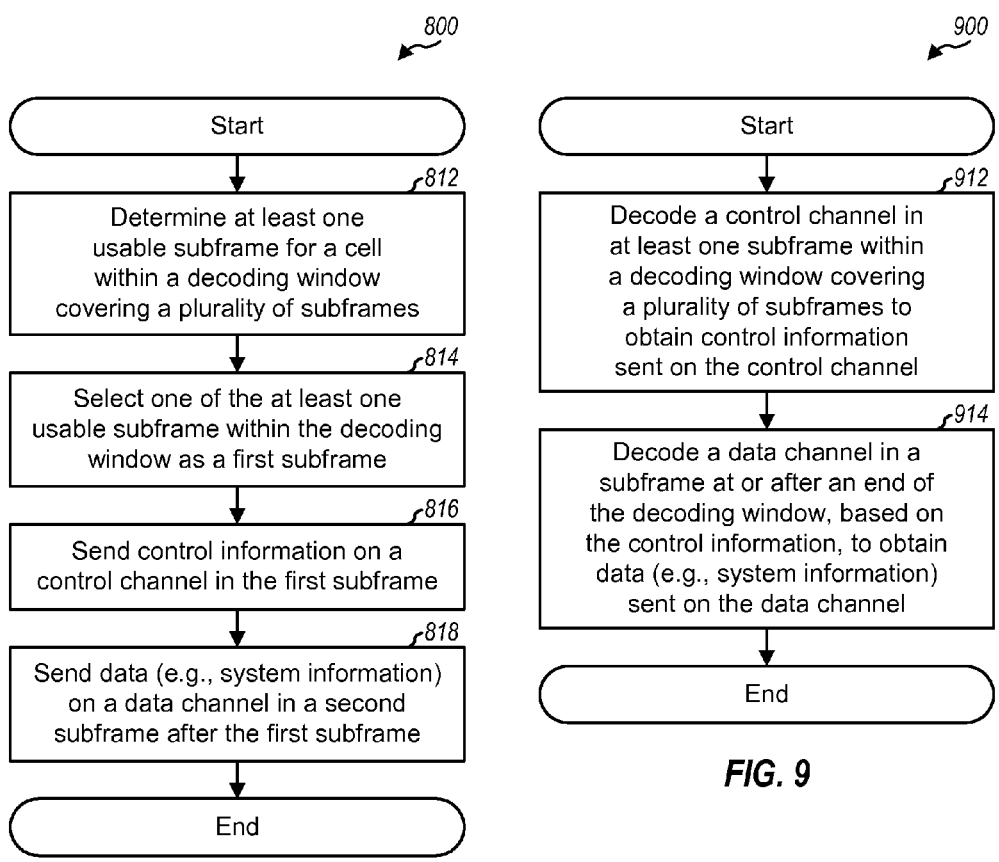
FIG. 8 shows a process for sending control information with cross-subframe signaling.
FIG. 9 shows a process for receiving control information with window-based decoding for cross-subframe signaling.

FIG. 8 shows a design of a process 800 for sending control information with cross-subframe signaling. Process 800 may be performed by a cell or by some other entity. The cell may determine at least one usable subframe for the cell within a decoding window covering a plurality of subframes (block 812). Each usable subframe may have less interference than the remaining subframes within the decoding window. The cell may select one of the at least one usable subframe within the decoding window as a first subframe in which to send control information on a control channel (block 814). The cell may send the control information on the control channel in the first subframe within the decoding window (block 816). The cell may send data on a data channel in a second subframe after the first subframe (block 818). The control information may comprise at least one parameter used to decode the data channel.

In general, the cell may send the control information in any subframe within the decoding window, which may end at the second subframe in which the data channel is sent, e.g., as shown in FIG. 7. In one design, the data sent on the data channel may comprise system information and/or paging information. For example, the data sent on the data channel may comprise SIB1 carrying scheduling information for SIBs of at least one other type. The control channel may comprise the PDCCH or some other control channel, and the data channel may comprise the PDSCH or some other data channel.

FIG. 9 shows a design of a process 900 for receiving control information with window-based decoding for cross-subframe signaling. Process 900 may be performed by a UE or by some other entity. The UE may decode a control channel in at least one subframe within a decoding window covering a plurality of subframes to obtain control information sent on the control channel (block 912). The UE may then decode a data channel in a subframe at or after an end of the decoding window, based on the control information, to obtain data sent on the data channel (block 914). The UE may also decode the control channel in the subframe in which the data channel is decoded to obtain the control information sent on the control channel. The control channel may comprise the PDCCH or some other control channel, and the data channel may comprise the PDSCH or some other data channel.

In one design, the decoding window may cover at least one usable subframe for a cell transmitting the control information. Usable subframes may be allocated to the cell with a particular periodicity. The decoding window may have a size that may be determined based on the periodicity of the usable subframes for the cell. For example, the cell may be allocated usable subframes with a periodicity of M subframes, and the decoding window may cover M−1 subframes. In one design, the decoding window may have a configurable size, which may be different for different cells or different UEs. In another design, the decoding window may have a fixed size that may be applicable for all cells and/or all UEs.

The UE may not know the location of the usable subframes for the cell. Hence, from the UE's perspective, the control information may be sent in any subframe within the decoding window. In one design of block 912, the UE may decode the control channel in one subframe within the decoding window at a time, starting with an earliest subframe within the decoding window. The UE may terminate decoding of the control channel when the control information is obtained from the control channel or when all subframes within the decoding window have been considered.

Figure 10:
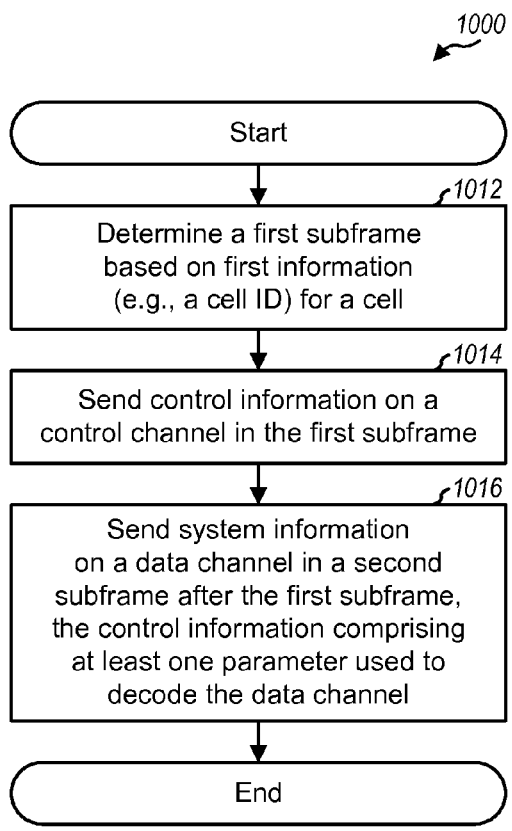
FIG. 10 shows a process for sending control information in a designated subframe having less interference.

FIG. 10 shows a design of a process 1000 for sending control information in a designated subframe having less interference. Process 1000 may be performed by a cell or by some other entity. The cell may determine a first subframe, which may have less interference from other cells, based on first information for the cell (block 1012). The cell may send control information on a control channel in the first subframe (block 1014). The cell may also send system information on a data channel in a second subframe after the first subframe (block 1016). The control information may comprise at least one parameter used to decode the data channel. The cell may also send the control information on the control channel in the second subframe, e.g., for UEs that expect the control channel and the data channel to be sent in the same subframe.

In one design, the cell may send at least one synchronization signal comprising the first information. In one design, the first information may comprise a cell ID of the cell. The cell may determine a group of cell IDs that includes the cell ID of the cell. The cell may determine a set of designated subframes associated with this group of cell IDs and having less interference from other cells. The cell may select the first subframe to send the control information from the set of designated subframes applicable to the cell.

Figure 11:
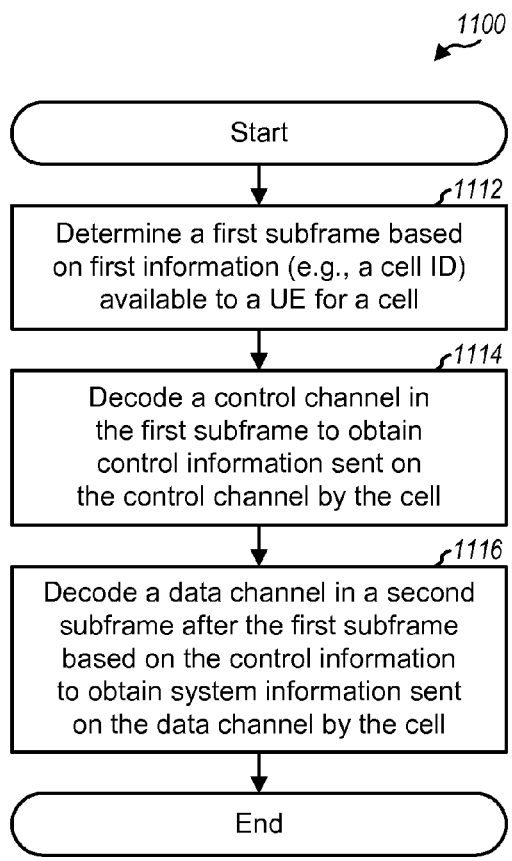
FIG. 11 shows a process for receiving control information sent in a designated subframe having less interference.

FIG. 11 shows a design of a process 1100 for receiving control information in a designated subframe having less interference. Process 1100 may be performed by a UE or by some other entity. The UE may determine a first subframe based on first information available to the UE for a cell (block 1112). The first subframe may have less interference from other cells. The UE may decode a control channel in the first subframe to obtain control information sent on the control channel by the cell (block 1114). The UE may decode a data channel in a second subframe after the first subframe based on the control information to obtain system information sent on the data channel by the cell (block 1116). The control channel may comprise the PDCCH or some other control channel, and the data channel may comprise the PDSCH or some other data channel.

In one design, the UE may obtain the first information based on at least one synchronization signal from the cell. The first information may comprise a cell ID of the cell. In one design of block 1112, the UE may determine a group of cell IDs that includes the cell ID of the cell. The UE may then determine a set of designated subframes associated with the group of cell IDs. The UE may identify the first subframe in which the control information is sent from the set of designated subframes.

Figure 12:
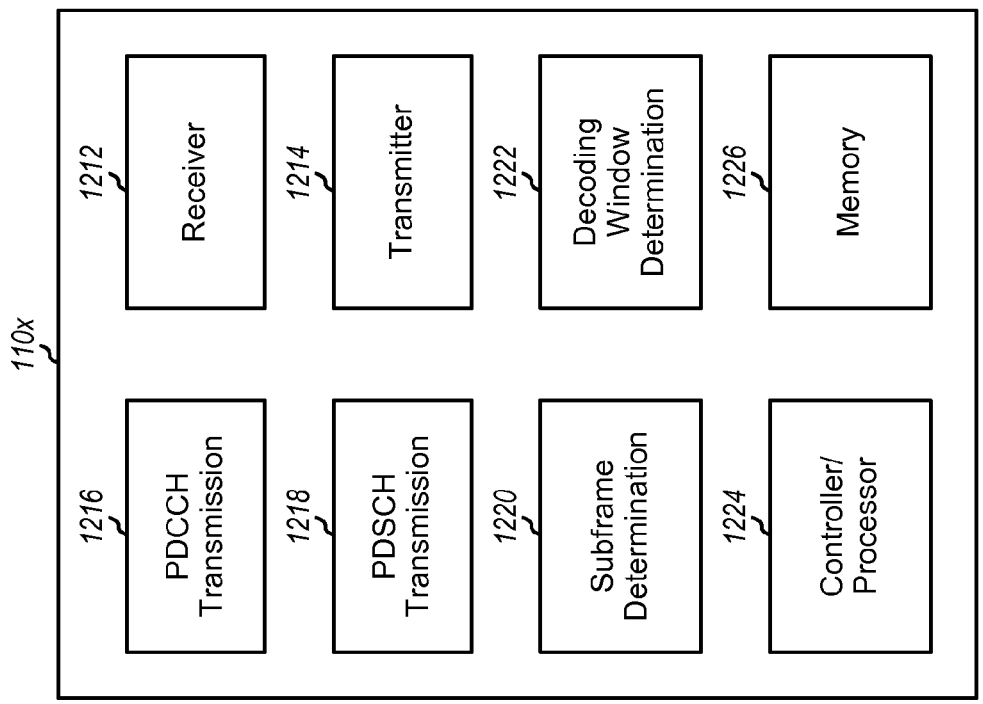
FIG. 12 shows a block diagram of a base station.

FIG. 12 shows a block diagram of a design of a base station 110x that supports one or more cells. Within base station 110x, a receiver 1212 may receive uplink signals transmitted by UEs. A transmitter 1214 may transmit downlink signals to UEs. A module 1216 may perform processing to send control information on the PDCCH and/or other control channels. A module 1218 may perform processing to send data (e.g., traffic data, system information, paging information, etc.) on the PDSCH and/or other data channels. A module 1220 may determine different types of subframes for each cell supported by base station 110x, e.g., based on the allocated subframes for the cell. A module 1222 may place a decoding window at the proper location, e.g., based on a specified subframe in which a PDSCH transmission of interest is sent. The various modules within base station 110x may operate as described above. A controller/processor 1224 may direct the operation of various modules within base station 110x. A memory 1226 may store data and program codes for base station 110x.

Figure 13:
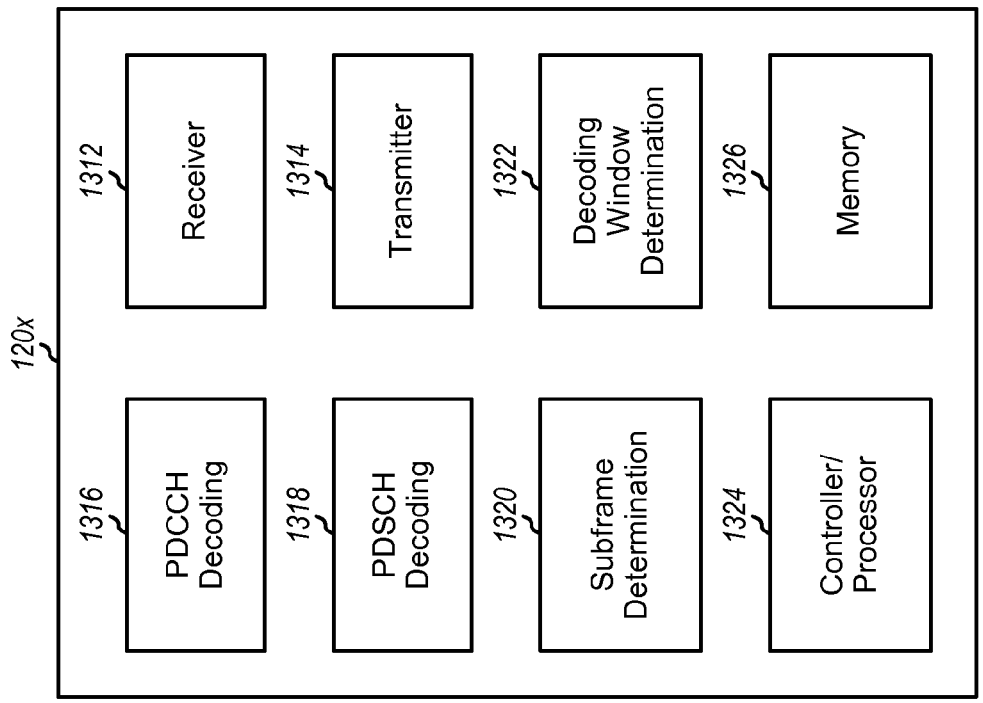
FIG. 13 shows a block diagram of a UE.

FIG. 13 shows a block diagram of a design of a UE 120x. Within UE 120x, a receiver 1312 may receive downlink signals transmitted by base stations. A transmitter 1314 may transmit uplink signals to base stations. A module 1316 may receive and decode the PDCCH and/or other control channels to recover control information. A module 1318 may receive and decode the PDSCH and/or other data channels to recover data such as traffic data, system information, paging information, etc. A module 1320 may determine the type of each subframe for each cell of interest. Module 1320 may also determine designated subframes for each cell of interest, e.g., based on the cell IDs of these cells. A module 1322 may place a decoding window at the proper location, e.g., based on a specified subframe in which a PDSCH transmission of interest is sent. The various modules within UE 120x may operate as described above. A controller/processor 1324 may direct the operation of various modules within UE 120x. A memory 1326 may store data and program codes for UE 120x.

The modules in FIGS. 12 and 13 may comprise processors, electronic devices, hardware devices, electronic components, logical circuits, memories, software codes, firmware codes, etc., or any combination thereof.

Figure 14:
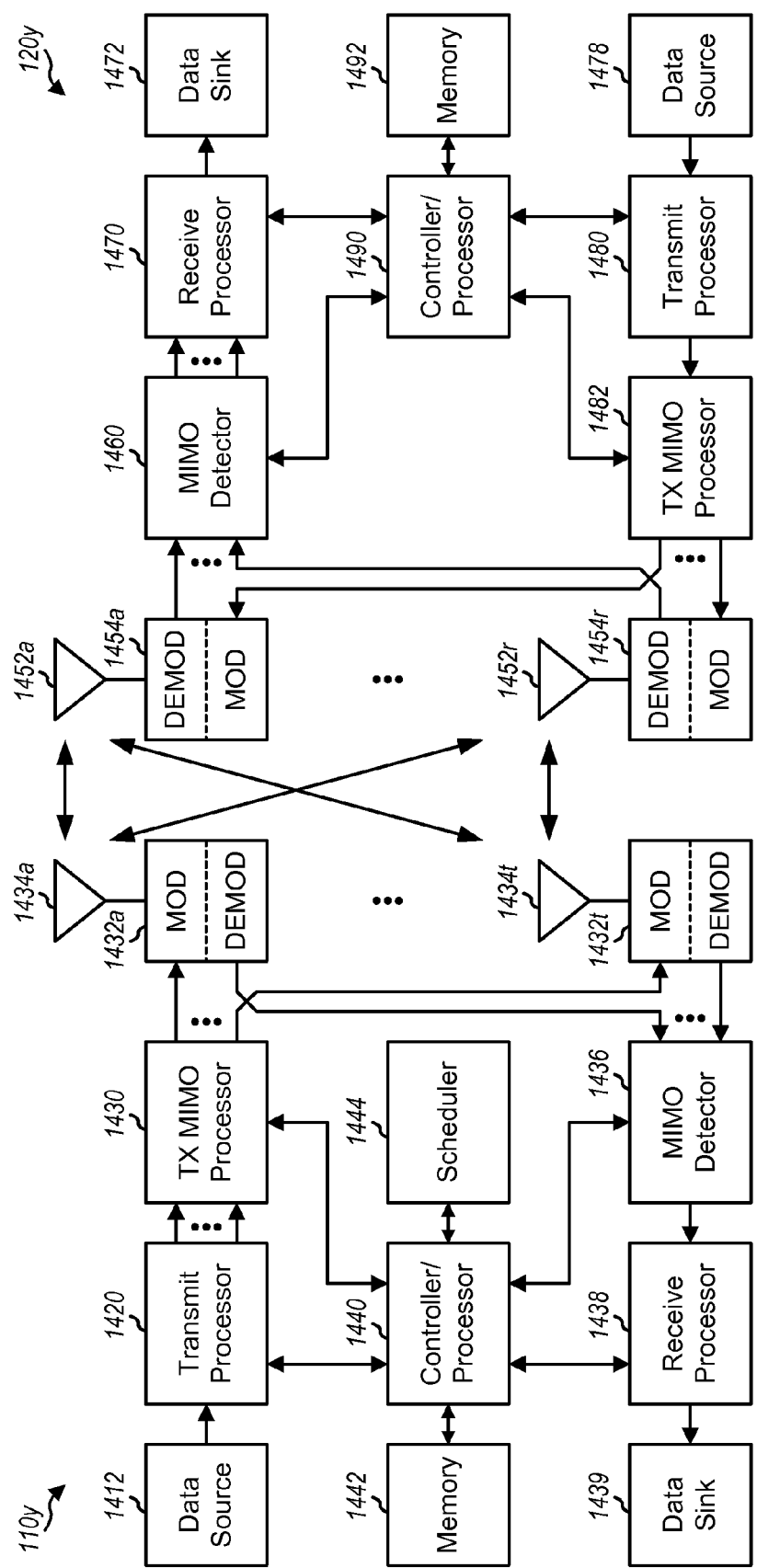
FIG. 14 shows another block diagram of a base station and a UE.

FIG. 14 shows a block diagram of a design of a base station/eNB 110y and a UE 120y, which may be one of the base stations/eNBs and one of the UEs in FIG. 1. Base station 110y may be equipped with T antennas 1434a through 1434t, and UE 120y may be equipped with R antennas 1452a through 1452r, where in general T≥1 and R≥1.

At base station 110y, a transmit processor 1420 may receive traffic data from a data source 1412 for one or more UEs scheduled for data transmission on the downlink, process (e.g., encode and modulate) the traffic data for each UE based on one or more modulation and coding schemes selected for that UE, and provide data symbols for all UEs. Transmit processor 1420 may also process system information (e.g., MIB and SIBs), paging information, and/or other information and provide data symbols. Transmit processor 1420 may also process control information (e.g., grants, etc.) and provide control symbols. Transmit processor 1420 may also generate reference symbols for synchronization signals and reference signals. A transmit (TX) multiple-input multiple-output (MIMO) processor 1430 may precode the data symbols, the control symbols, and/or the reference symbols (if applicable) and may provide T output symbol streams to T modulators (MOD) 1432a through 1432t. Each modulator 1432 may process its output symbol stream (e.g., for OFDM, etc.) to obtain an output sample stream. Each modulator 1432 may further condition (e.g., convert to analog, filter, amplify, and upconvert) its output sample stream and generate a downlink signal. T downlink signals from modulators 1432a through 1432t may be transmitted via T antennas 1434a through 1434t, respectively.

At UE 120y, R antennas 1452a through 1452r may receive the downlink signals from base station 110y and other base stations, and each antenna 1452 may provide a received signal to an associated demodulator (DEMOD) 1454. Each demodulator 1454 may condition (e.g., filter, amplify, downconvert, and digitize) its received signal to obtain samples and may further process the samples (e.g., for OFDM, etc.) to obtain received symbols. A MIMO detector 1460 may obtain received symbols from all demodulators 1454, perform MIMO detection on the received symbols if applicable, and provide detected symbols. A receive processor 1470 may process (e.g., demodulate and decode) the detected symbols, provide decoded traffic data for UE 120y to a data sink 1472, and provide decoded control information, system information, paging information, etc., to a controller/processor 1490.

On the uplink, at UE 120y, traffic data from a data source 1478, control information from controller/processor 1490, and reference signals may be processed by a transmit processor 1480, precoded by a TX MIMO processor 1482 if applicable, further processed by modulators 1454a through 1454r, and transmitted to base station 110y. At base station 110y, the uplink signals from UE 120y and other UEs may be received by antennas 1434, processed by demodulators 1432, detected by a MIMO detector 1436 if applicable, and further processed by a receive processor 1438 to recover the traffic data and control information sent by UE 120y and other UEs. Processor 1438 may provide the recovered traffic data to a data sink 1439 and may provide the recovered control information to controller/processor 1440.

Controllers/processors 1440 and 1490 may direct the operation at base station 110y and UE 120y, respectively. Processor 1420, processor 1440, and/or other processors and modules at base station 110y may perform or direct process 800 in FIG. 8, process 1000 in FIG. 10, and/or other processes for the techniques described herein. Processor 1470, processor 1490, and/or other processors and modules at UE 120y may perform or direct process 900 in FIG. 9, process 1100 in FIG. 11, and/or other processes for the techniques described herein. Memories 1442 and 1492 may store data and program codes for base station 110y and UE 120y, respectively. A scheduler 1444 may schedule UE 120y and/or other UEs for data transmission on the downlink and/or uplink.

In one configuration, apparatus 110x or 110y for wireless communication may include means for sending control information on a control channel in a first subframe within a decoding window covering a plurality of subframes, and means for sending data on a data channel in a second subframe after the first subframe, the control information comprising at least one parameter used to decode the data channel.

In one configuration, apparatus 120x or 120y for wireless communication may include means for decoding a control channel in at least one subframe within a decoding window covering a plurality of subframes to obtain control information sent on the control channel, and means for decoding a data channel in a subframe at or after the end of the decoding window, based on the control information, to obtain data sent on the data channel.

In one configuration, apparatus 110x or 110y for wireless communication may include means for determining a first subframe based on first information for a cell, means for sending control information on a control channel in the first subframe, and means for sending system information on a data channel in a second subframe after the first subframe, the control information comprising at least one parameter used to decode the data channel.

In one configuration, apparatus 120x or 120y for wireless communication may include means for determining a first subframe based on first information available to a UE for a cell, means for decoding a control channel in the first subframe to obtain control information sent on the control channel by the cell, and means for decoding a data channel in a second subframe after the first subframe based on the control information to obtain system information sent on the data channel by the cell.

In an aspect, the aforementioned means may be processor(s) 1420 and/or 1440 at base station 110y and/or processors(s) 1470 and/or 1490 at UE 120y, which may be configured to perform the functions recited by the aforementioned means. In another aspect, the aforementioned means may be one or more modules or any apparatus configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   configuring a size of a decoding window that covers a plurality of subframes, the size of the decoding window being configurable for different user equipment or different cells;
   decoding a control channel in at least one subframe within the decoding window covering the plurality of subframes to obtain control information sent on the control channel; and
   decoding, based on the control information, a data channel in a second subframe to obtain data sent on the data channel, wherein the second subframe occurs subsequent to an end of the decoding window,
   wherein the at least one subframe is usable to a cell to send the control information on the control channel by having less interference than remaining subframes within the decoding window, the size of the decoding window being configurable based at least in part on a periodicity with which the at least one subframe is allocated to the cell.

2. The method of claim 1, wherein the decoding the control channel comprises decoding the control channel in one subframe within the decoding window at a time, starting with an earliest subframe within the decoding window, until the control information is obtained from the control channel or all subframes within the decoding window have been considered.

3. The method of claim 1, wherein the data sent on the data channel comprises system information, or paging information, or both.

4. The method of claim 1, wherein the data sent on the data channel comprises system information block type 1 (SIB1) carrying scheduling information for system information blocks of at least one other type.

5. The method of claim 1, further comprising:
   decoding the control channel in the subframe in which the data channel is decoded to obtain the control information sent on the control channel.

6. The method of claim 1, wherein the control channel comprises a Physical Downlink Control Channel (PDCCH) and the data channel comprises a Physical Downlink Shared Channel (PDSCH).

7. An apparatus for wireless communication, comprising:
   means for configuring a size of a decoding window that covers a plurality of subframes, the size of the decoding window being configurable for different user equipment or different cells;
   means for decoding a control channel in at least one subframe within the decoding window covering the plurality of subframes to obtain control information sent on the control channel; and
   means for decoding, based on the control information, a data channel in a second subframe to obtain data sent on the data channel, wherein the second subframe occurs subsequent to an end of the decoding window,
   wherein the at least one subframe is usable to a cell to send the control information on the control channel by having less interference than remaining subframes within the decoding window, the size of the decoding window being configurable based at least in part on a periodicity with which the at least one subframe is allocated to the cell.

8. The apparatus of claim 7, wherein the means for decoding the control channel comprises means for decoding the control channel in one subframe within the decoding window at a time, starting with an earliest subframe within the decoding window, until the control information is obtained from the control channel or all subframes within the decoding window have been considered.

9. An apparatus for wireless communication, comprising:
   at least one processor configured to configure a size of a decoding window that covers a plurality of subframes, the size of the decoding window being configurable for different user equipment or different cells;
    to decode a control channel in at least one subframe within the decoding window covering the plurality of subframes to obtain control information sent on the control channel, and
    to decode, based on the control information, a data channel in a second subframe to obtain data sent on the data channel, wherein the second subframe occurs subsequent to an end of the decoding window,
    wherein the at least one subframe is usable to a cell to send the control information on the control channel by having less interference than remaining subframes within the decoding window, the size of the decoding window being configurable based at least in part on a periodicity with which the at least one subframe is allocated to the cell, and a memory coupled to the at least one processor.

10. The apparatus of claim 9, wherein the at least one processor is configured to decode the control channel in one subframe within the decoding window at a time, starting with an earliest subframe within the decoding window, until the control information is obtained from the control channel or all subframes within the decoding window have been considered.

11. A non-transitory computer-readable medium storing computer executable code for wireless communication, comprising:
    code for configuring a size of a decoding window that covers a plurality of subframes, the size of the decoding window being configurable for different user equipment or different cells;
    code for decoding a control channel in at least one subframe within the decoding window covering the plurality of subframes to obtain control information sent on the control channel; and
    code for decoding, based on the control information, a data channel in a second subframe to obtain data sent on the data channel, wherein the second subframe occurs subsequent to an end of the decoding window,
    wherein the at least one subframe is usable to a cell to send the control information on the control channel by having less interference than remaining subframes within the decoding window, the size of the decoding window being configurable based at least in part on a periodicity with which the at least one subframe is allocated to the cell.

12. A method for wireless communication, comprising:
    determining at least one subframe for a cell within a decoding window covering a plurality of subframes, the at least one subframe being usable to the cell to send control information on a control channel by having less interference than remaining subframes within the decoding window, one of the at least one subframe being a first subframe, a size of the decoding window being configurable based at least in part on a periodicity with which the at least one subframe is allocated to the cell;
    sending the control information to a user equipment on the control channel in the first subframe within the decoding window, the size of the decoding window being configured by the user equipment, and the size of the decoding window being configurable for different user equipment or different cells; and
    sending data on a data channel in a second subframe, wherein the second subframe occurs subsequent to the first subframe and subsequent to an end of the decoding window, the control information comprising at least one parameter used to decode the data channel.

13. The method of claim 12, further comprising:
    selecting one of the at least one subframe within the decoding window as the first subframe in which to send the control information on the control channel.

14. The method of claim 12, wherein the data sent on the data channel comprises system information, or paging information, or both.

15. The method of claim 12, wherein the data sent on the data channel comprises system information block type 1 (SIB1) carrying scheduling information for system information blocks of at least one other type.

16. The method of claim 12, wherein the control channel comprises a Physical Downlink Control Channel (PDCCH) and the data channel comprises a Physical Downlink Shared Channel (PDSCH).

17. An apparatus for wireless communication, comprising:
    means for determining at least one subframe for a cell within the decoding window covering a plurality of subframes, the at least one subframe being usable to the cell to send control information on a control channel by having less interference than remaining subframes within the decoding window, one of the at least one subframe being a first subframe, a size of the decoding window being configurable based at least in part on a periodicity with which the at least one subframe is allocated to the cell;
    means for sending the control information to a user equipment on the control channel in the first subframe within the decoding window, the size of the decoding window being configured by the user equipment, and the size of the decoding window being configurable for different user equipment or different cells; and
    means for sending data on a data channel in a second subframe, wherein the second subframe occurs subsequent to the first subframe and subsequent to an end of the decoding window, the control information comprising at least one parameter used to decode the data channel.

18. The apparatus of claim 17, further comprising:
    means for selecting one of the at least one subframe within the decoding window as the first subframe in which to send the control information on the control channel.

19. A method for wireless communication, comprising:
    configuring a size of a decoding window that covers a plurality of subframes, the size of the decoding window being configurable for different user equipment or different cells;
    determining a first subframe within the decoding window covering the plurality of subframes based on first information available to a UE user equipment (UE) for a cell;
    decoding a control channel in the first subframe to obtain control information sent on the control channel by the cell; and
    decoding, based on the control information, a data channel in a second subframe to obtain system information sent on the data channel by the cell, wherein the second subframe occurs subsequent to the first subframe and subsequent to an end of the decoding window,
    wherein the first subframe is one of at least one subframe within the decoding window usable to send the control information on the control channel by having less interference than remaining subframes within the decoding window, the size of the decoding window being configurable based at least in part on a periodicity with which the at least one subframe is allocated to the cell.

20. The method of claim 19, further comprising:
obtaining the first information based on at least one synchronization signal from the cell.

21. The method of claim 19, wherein the first information comprises a cell identity (ID) of the cell.

22. The method of claim 21, wherein the determining the first subframe comprises:
determining a group of cell IDs including the cell ID of the cell;
determining a set of subframes associated with the group of cell IDs; and
identifying the first subframe from the set of subframes.

23. The method of claim 19, wherein the control channel comprises a Physical Downlink Control Channel (PDCCH) and the data channel comprises a Physical Downlink Shared Channel (PDSCH).

24. An apparatus for wireless communication, comprising:
means for configuring a size of a decoding window that covers a plurality of subframes, the size of the decoding window being configurable for different user equipment or different cells;
means for determining a first subframe within the decoding window covering the plurality of subframes based on first information available to a user equipment (UE) for a cell;
means for decoding a control channel in the first subframe to obtain control information sent on the control channel by the cell; and
means for decoding, based on the control information, a data channel in a second subframe to obtain system information sent on the data channel by the cell, wherein the second subframe occurs subsequent to the first subframe and subsequent to an end of the decoding window,
wherein the first subframe is one of at least one subframe within the decoding window usable to send the control information on the control channel by having less interference than remaining subframes within the decoding window, the size of the decoding window being configurable based at least in part on a periodicity with which the at least one subframe is allocated to the cell.

25. The apparatus of claim 24, wherein the first information comprises a cell identity (ID) of the cell.

26. The apparatus of claim 25, wherein the means for determining the first subframe comprises:
means for determining a group of cell IDs including the cell ID of the cell;
means for determining a set of subframes associated with the group of cell IDs; and
means for identifying the first subframe from the set of subframes.

27. A method for wireless communication, comprising:
determining a first subframe within a decoding window covering a plurality of subframes based on first information for a cell, a size of the decoding window being configured by a user equipment, and the size of the decoding window being configurable for different user equipment or different cells;
sending control information on a control channel in the first subframe; and
sending system information on a data channel in a second subframe, wherein the second subframe occurs subsequent to the first subframe and subsequent to an end of the decoding window, the control information comprising at least one parameter used to decode the data channel,
wherein the first subframe is one of at least one subframe within the decoding window usable to send the control information on the control channel by having less interference than remaining subframes within the decoding window, the size of the decoding window being configurable based at least in part on a periodicity with which the at least one subframe is allocated to the cell.

28. The method of claim 27, further comprising:
sending at least one synchronization signal comprising the first information.

29. The method of claim 27, wherein the first information comprises a cell identity (ID) of the cell.

30. The method of claim 29, wherein the determining the first subframe comprises:
determining a group of cell IDs including the cell ID of the cell;
determining a set of subframes associated with the group of cell IDs; and
selecting the first subframe from the set of subframes.

31. The method of claim 27, further comprising:
sending the control information on the control channel in the second subframe.

32. An apparatus for wireless communication, comprising:
means for determining a first subframe within a decoding window covering a plurality of subframes based on first information for a cell, a size of the decoding window being configured by a user equipment, and the size of the decoding window being configurable for different user equipment or different cells;
means for sending control information on a control channel in the first subframe; and
means for sending system information on a data channel in a second subframe, wherein the second subframe occurs subsequent to the first subframe and subsequent to an end of the decoding window, the control information comprising at least one parameter used to decode the data channel,
wherein the first subframe is one of at least one subframe within the decoding window usable to send the control information on the control channel by having less interference than remaining subframes within the decoding window, the size of the decoding window being configurable based at least in part on a periodicity with which the at least one subframe is allocated to the cell.

33. The apparatus of claim 32, wherein the first information comprises a cell identity (ID) of the cell.

34. The apparatus of claim 33, wherein the means for determining the first subframe comprises:
means for determining a group of cell IDs including the cell ID of the cell;
means for determining a set of subframes associated with the group of cell IDs; and
means for selecting the first subframe from the set of subframes.

35. The method of claim 1, wherein the control channel is decoded in a first subframe of the at least one subframe and within the decoding window, and wherein the data channel is decoded in the second subframe.

36. The method of claim 1, wherein the size of the decoding window is configurable to be different for different user equipment or different cells.

* * * * *